Sept. 16, 1947.          H. F. KAELIN          2,427,462
AUTOMATIC CONTROL MEANS FOR ELECTRICAL GENERATING SYSTEMS
Filed May 14, 1945
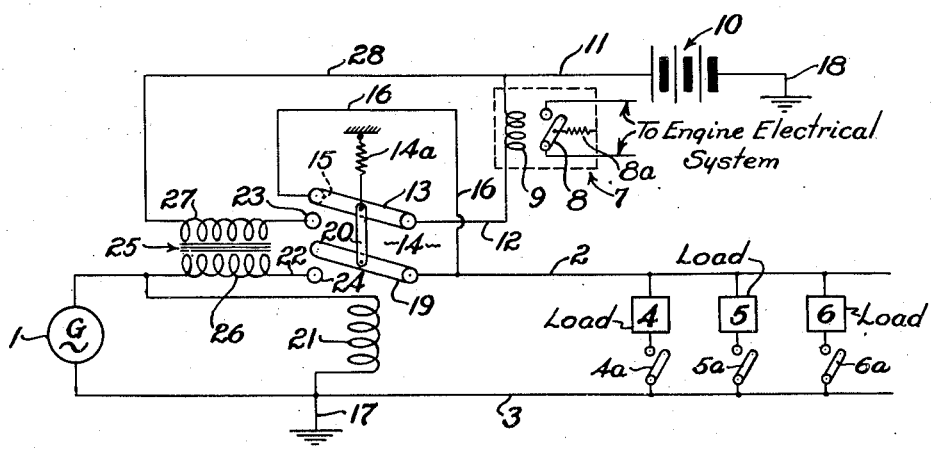
INVENTOR.
Henry F. Kaelin
BY
Attorney Patented Sept. 16, 1947

2,427,462

UNITED STATES PATENT OFFICE 2,427,462

AUTOMATIC CONTROL MEANS FOR ELECTRICAL GENERATING SYSTEMS

Henry F. Kaelin, Los Angeles, Calif.

Application May 14, 1945, Serial No. 593,590

5 Claims. (Cl. 290—30)

This invention relates to electrical generating systems, particularly to such as are utilized in connection with an internal combustion engine, for providing an independent source of power, for example for farms, cabins, boats, or the like. More particularly it relates to automatic control apparatus for such systems.

It is an object of this invention to provide improved control apparatus for such a system, whereby application of a load automatically causes the system to become energized, the system being maintained energized as long as any load is on the system, loads being added and removed at will, the control means automatically causing the system to become deenergized upon entire removal of the load.

It is another object of this invention to provide, in connection with such a generating system, apparatus for automatically controlling the mechanism for activating the prime mover, upon imposing a load on the system, and which causes such mechanism to maintain the prime mover in operation only as long as such load is present.

It is another object of this invention to provide control apparatus for such a generating system which automatically causes the system to become energized upon imposition of any load between a predetermined minimum amount and the maximum which the system is capable of carrying, and which maintains the system continuously energized throughout any changes in the amount of the load until the load falls below such minimum, when the system is caused to become deenergized.

It is another object of this invention to provide, in connection with such a generating system, apparatus for automatically controlling the mechanism for activating the prime mover, which is operated initially by current from a source independent of the generator, but which upon energization of the system by the generator, is maintained operative by the current in the system.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

In the drawing, the single figure is a diagram of a circuit incorporating the features of the invention.

Referring to the drawing, all parts are shown in the relative positions they would occupy when the system is inactive. The numeral 1 denotes a conventional A. C. single phase generator of any suitable type and capacity, and arranged to energize the mains or leads 2 and 3, between which are adapted to be connected optionally any or all of any number of loads, such as indicated at 4, 5 and 6. These loads may be of any size as long as each load is greater than a certain minimum to be presently discusssed, and as long as the generator is not overloaded. The loads are arranged to be connected between the mains 2 and 3 by switches 4—a, 5—a and 6—a respectively.

The generator 1 is arranged to be driven by an internal combustion engine of any preferred type provided with a self-starter, and controlled in a known manner by the relay 7. Such a relay may include a switch 8 arranged to be closed and maintained closed by a coil 9 upon energization thereof, the arrangement being such that closing of the switch causes the engine to start, and to run as long as the switch remains closed. This may be conveniently referred to as activating the engine. Upon deenergization of the coil 9, switch 8 opens and the engine stops. Systems for operating an engine in this manner are commonly available, one of such being marketed under the trade name "Startex."

The arrangement is such that connection of any of the loads 4, 5 and 6 to the mains 2 and 3, as by closing the appropriate switch or switches 4—a, 5—a or 6—a, causes the relay 7 to close and activate the prime mover to drive the generator 1. For this purpose a source of current such as battery 10, which is independent of the generator 1 is provided. In order that the relay 7 may operate to close with a relatively small load 4, 5 or 6 and a battery 10 of low voltage, the coil 9 is made of high resistance. The relay 7 can readily be made sufficiently sensitive to operate for example with an ordinary six volt battery and a load of the order of 40 watts.

Upon connecting one of the loads, for example, the load indicated by the numeral 4 between the mains 2 and 3 by closing switch 4—a, coil 9 is connected in circuit with the battery 10 as follows. From one side of the battery 10, lead 11, coil 9, lead 12, arm 13 of the automatic control switch 14, contact 15, lead 16, main 2, load 4, switch 4—a, lead 3 to ground connection 17, and ground connection 18 to the other side of the battery 10.

The automatic switch 14 includes a second arm 19 connected to arm 13 as by a pivoted link 20, for simultaneous movement therewith, and is arranged for operation by a coil 21 which is continuously connected across the generator 1 by a main 22 and main 3.

When the generator 1 goes into operation as above described, the coil 21 is energized, swinging the arms 13 and 19 downward so that arm 13 moves from contact 15 to contact 23 and arm 19 engages contact 24. This disconnects the coil 9 and the load 4 from the battery 10, and connects the load 4 to the generator 1 as well as connecting the coil 9 to be energized by the generator 1. The load 4 is energized as follows: from the generator 1, main 22, contact 24, switch arm 19, main 2, load 4, switch 4—a, main 3 to the generator.

For energizing the relay coil 9 under these conditions, a suitable transformer 25 is provided, having a primary winding 26, connected in series with the load 4, as by being interposed in the lead 22, and a secondary winding 27 adapted to be connected with the coil 9. This circuit may be traced as follows: from winding 27, lead 28 to the coil 9, lead 12, switch arm 13, and contact 23 to the winding 27. Since the transformer primary 26 is in series with any load such as 4, which may be imposed on the generator 1, current in the transformer secondary 27 is dependent on the presence of such a load. Thus, upon removal of the load 4, as by opening switch 4—a, current flow will cease and the coil 9 will be deenergized, allowing switch 8 to open as in response to spring means 8—a, which causes the engine and generator 1 to stop. This in turn deenergizes coil 21 allowing the switch arms 13 and 19 to return to their upper positions in response to the spring means 14—a. This disconnects the main 2 from the generator 1 and reestablishes the connections between the coil 9 and battery 10, so that another cycle of operations will be instituted upon closing any of the switches 4—a, 5—a and 6—a.

It will be apparent that with the generator 1 operating and the load 4 in the circuit, the connecting of additional loads as 5 or 6, or both, by closing switches 5—a and 6—a, will have no effect, other than to slightly increase the output of the transformer 25. Furthermore, under such additional loading, the load 4 can be disconnected without affecting the operation of the generator. Loads can be added or disconnected as desired without affecting the operation of the system, as long as a load of the minimum amount, as before mentioned, is left in circuit. Upon removal of all such loads, the relay 7 is deenergized and stops the engine as before described.

I claim:

1. In control apparatus for an electrical system including an A. C. generator, a prime mover for driving said generator to cause energization of a circuit adapted to have optionally any of one or more loads connected therein, a source of current independent of said generator, and a relay for activating said prime mover adapted for actuation by said source, a transformer in said circuit, means for disconnecting said relay from said source and connecting said relay to said transformer, operated in response to energization of said circuit.

2. In control apparatus for an electrical system comprising an A. C. generator, at least a pair of leads for optionally connecting said generator with any of one or more loads, a prime mover for driving said generator, means for activating said prime mover including a relay, and an independent source of current: means for passing current from said source to actuate said relay upon connecting any of said loads across said leads, to cause activation of the prime mover and energization of the system, a transformer having a pair of windings, one of said windings being in series with said loads, and means whereby energization of the system causes said relay to be disconnected from said source and connected to the other winding of the transformer to maintain said prime mover activated.

3. In control apparatus for an electrical system comprising an electric generator, at least a pair of leads for optionally connecting said generator with any of one or more loads, a prime mover for driving said generator, means for activating said prime mover including a relay, and an independent source of current: a magnetically operated switch comprising a pair of arms connected for simultaneous movement between limits, one of said arms in one limiting position serving to connect said relay for operation by said source and in the other limiting position for operation in response to current in the system, a coil connected across said leads for moving said arms in response to current in the system, the other arm in said one limiting position serving to prevent flow of current from said source through said coil and in the other position causing energization of the connected loads by the generator.

4. In apparatus for actuating a relay to control the operation of an electric system, including a generator adapted to energize a circuit including a pair of mains in response to the connection of a load between the mains, and an independent source of current: means forming a pair of switch arms connected for simultaneous operation, one of said arms serving to connect and disconnect the load from the generator, means urging said arm to disconnecting position, a coil continuously connected between the mains for operating the switch arms and serving when energized to move said one arm to connecting position, the other arm serving upon movement of said one arm to disconnecting position to condition the relay for actuation by the independent source, and upon movement of said one arm to connecting position, to connect the relay for actuation in response to current flowing through said load from the generator.

5. In apparatus for actuating a relay to control the operation of an electric system including a generator adapted to energize a circuit including a pair of mains in response to the connection of a load between the mains, and an independent source of current: means forming a pair of switch arms connected for simultaneous operation, one of said arms serving to connect and disconnect the load from the generator, means urging said arm to disconnecting position, a coil continuously connected between the mains for operating the switch arms and serving when energized to move said one arm to connecting position, a transformer having a pair of windings, one of said windings being in series with the load, the other arm serving upon movement of said one arm to disconnecting position to condition the relay for actuation by the independent source, and upon movement of said one arm to connecting position to connect the relay to the other transformer winding.

HENRY F. KAELIN.

REFERENCES CITED

The following references are of record in the file of this patent:

UNITED STATES PATENTS

| Number | Name | Date |
|---|---|---|
| Re. 15,258 | Ernest | Jan. 3, 1922 |
| 1,028,364 | Knight et al. | June 4, 1912 |
| 1,202,632 | Witzel | Oct. 24, 1916 |
| 1,389,716 | Van Vleet | Sept. 6, 1921 |
| 1,448,190 | Bucher | Mar. 13, 1923 |
| 1,498,346 | Bucher | June 17, 1924 |
| 1,774,491 | Thorne | Aug. 26, 1930 |
| 1,842,509 | Dickey | Jan. 26, 1932 |